April 16, 1940.  H. R. FITZGERALD  2,197,075
VACUUM POWER BRAKE
Filed March 15, 1937  4 Sheets-Sheet 1
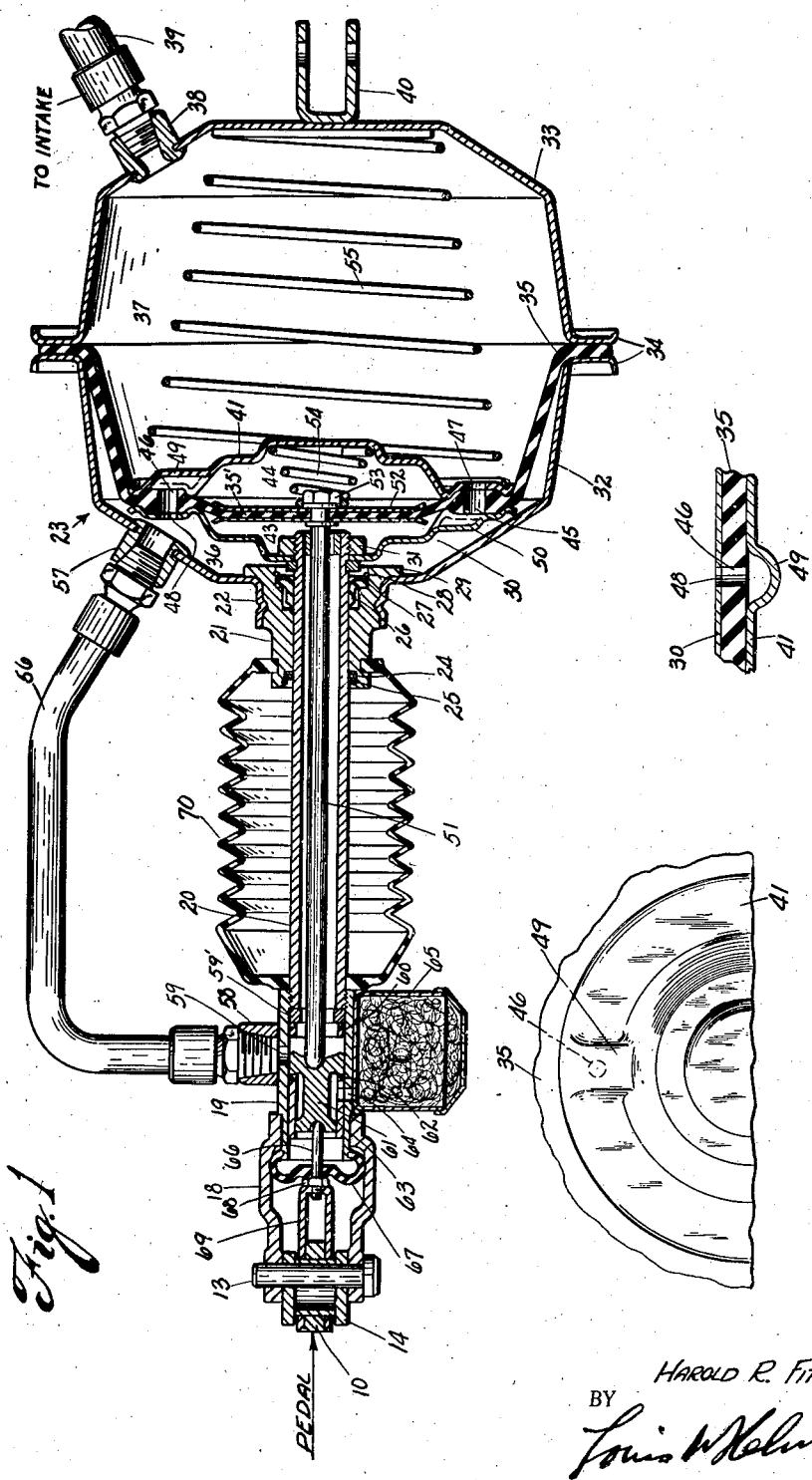
INVENTOR.
HAROLD R. FITZGERALD
BY
ATTORNEY.

April 16, 1940.  H. R. FITZGERALD  2,197,075
VACUUM POWER BRAKE
Filed March 15, 1937  4 Sheets-Sheet 2
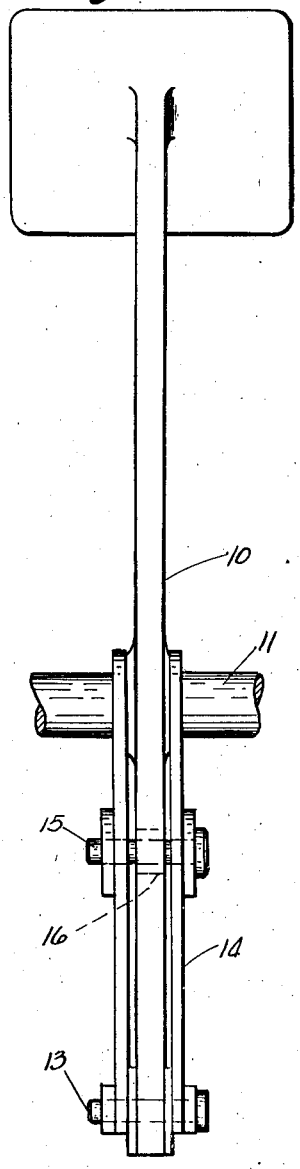
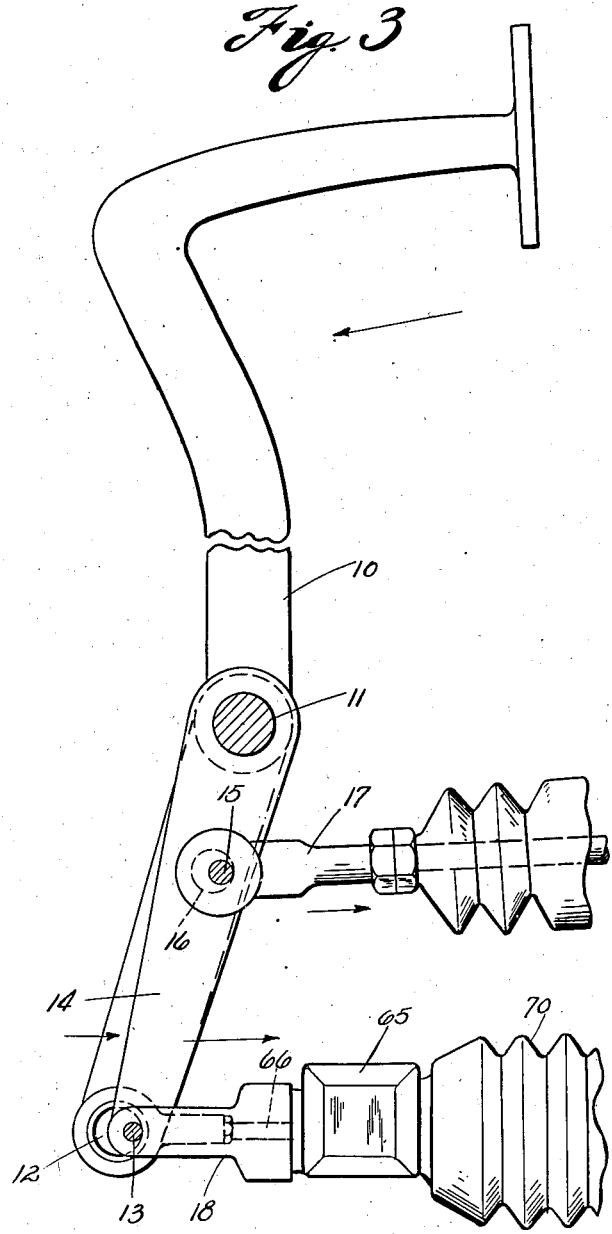
INVENTOR.
HAROLD R. FITZGERALD
BY
ATTORNEY.

April 16, 1940.  H. R. FITZGERALD  2,197,075
VACUUM POWER BRAKE
Filed March 15, 1937  4 Sheets-Sheet 3
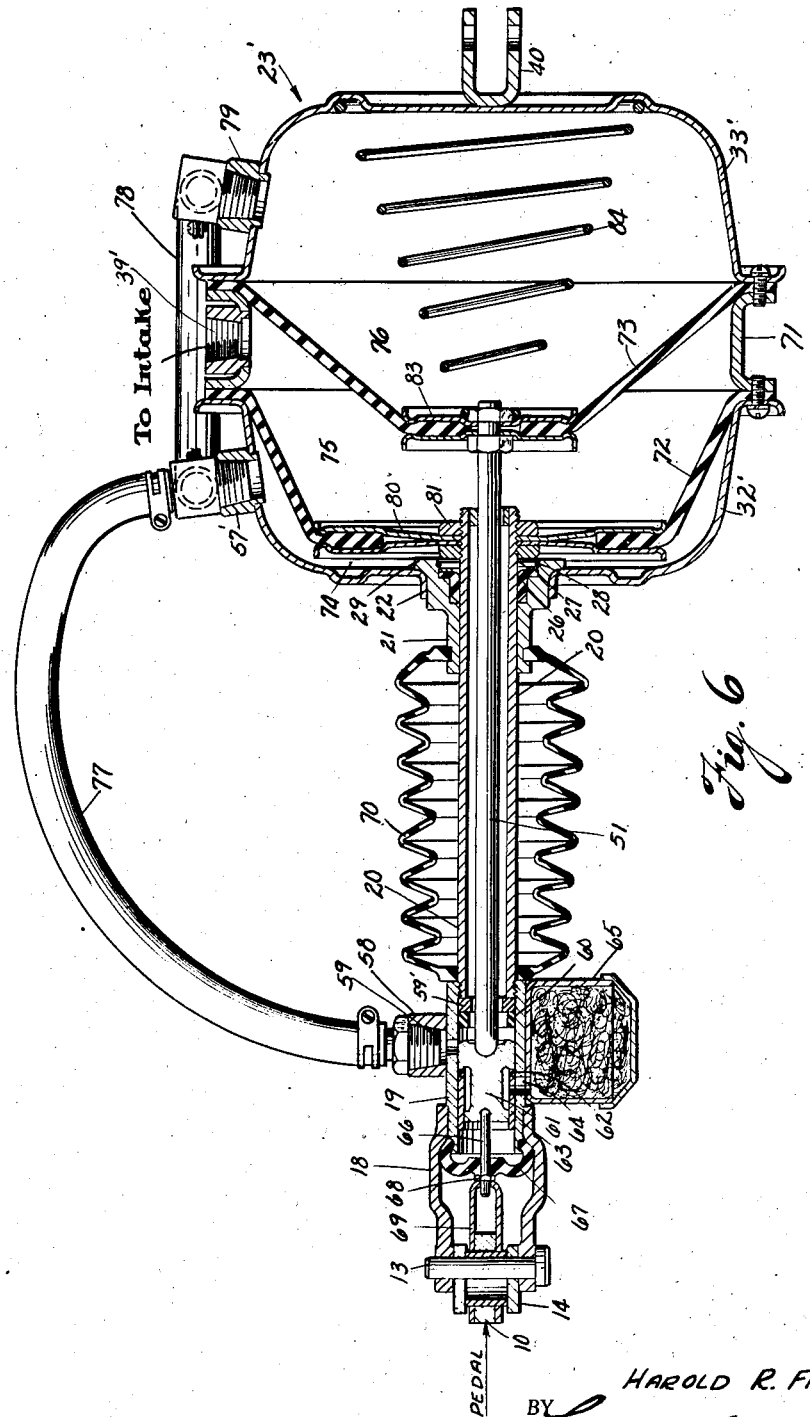
INVENTOR.
HAROLD R. FITZGERALD
BY
ATTORNEY.

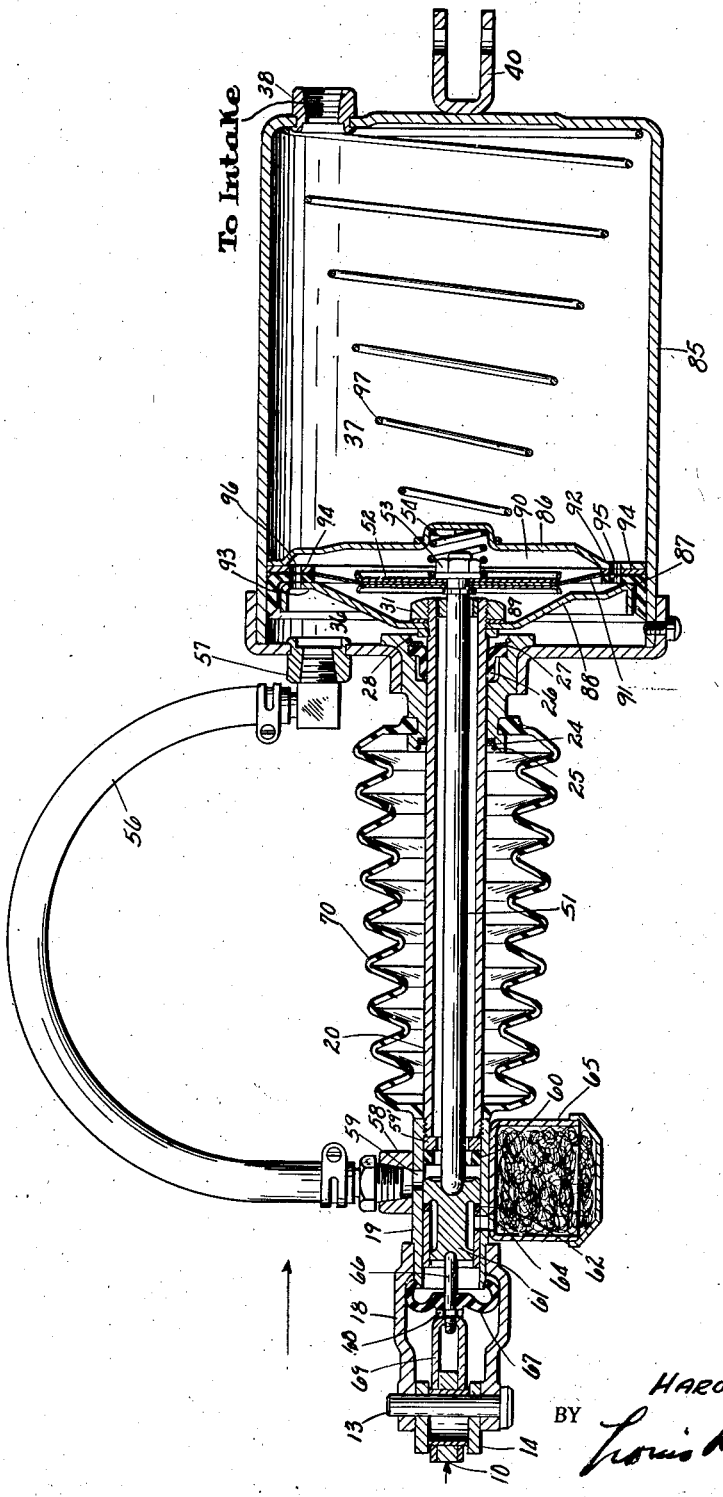

Patented Apr. 16, 1940

2,197,075

UNITED STATES PATENT OFFICE 2,197,075

VACUUM POWER BRAKE

Harold R. Fitzgerald, Rocky River, Ohio, assignor to The Midland Steel Products Company, Cleveland, Ohio, a corporation of Ohio Application March 15, 1937, Serial No. 130,965

4 Claims. (Cl. 121—41)

This invention relates to new and useful improvements in vacuum power brakes and has for its important object, the provision of a compact self contained unit which can be readily installed in the braking systems of present motor vehicles.

Another important object of the invention is to employ the pressure existing in the power actuator for controlling the position of the control valve in various stages of braking and for the purpose of apprising the operator of the extent to which the brakes are applied in all positions of the operating parts.

Other objects and advantages of the invention will become apparent during the course of the following description.

In the accompanying drawings forming a part of the application and wherein like numerals are employed to designate like parts throughout the several views, Fig. 1 is a longitudinal section through the power unit.

Fig. 2 is a side elevation of the foot pedal and its connection to the forward part of the power unit and also showing the connection of the mechanism to a brake system.

Fig. 3 is an end view of the foot pedal linkage.

Fig. 4 is an enlarged fragmentary section of a part of the diaphragm.

Fig. 5 is an elevation of a part of the housing applied to the diaphragm.

Fig. 6 is a longitudinal section through a modified form of power unit, and

Fig. 7 is a longitudinal section through another modified form of power unit.

Referring now more particularly to the drawings, the numeral 10 designates the usual foot pedal loosely mounted on a shaft 11 and having its lower end provided with an enlarged eyelet 12 through which a transverse pin 13 of the power unit extends and provides a lost motion connection. This pin 13 also extends transversely through the lower ends of a pair of levers 14 mounted at their upper ends upon the shaft 11 and arranged upon opposite sides of the foot pedal. A pin 15 extends transversely through the intermediate portions of these levers and also through an opening 16 in the lever, much larger than the diameter of the pin 15. This pin 15 serves to connect the forked end of a brake rod 17 which is moved in the direction of the arrow when the brake pedal is depressed to move the piston of a master cylinder of a hydraulic brake system forwardly thereby to move the column of liquid through the respective lines to the respective brake or wheel cylinders located in the various brake drums. Thus a brake application may be made by physical power only and without the assistance of the sources of power.

In order that the brake application can also be accomplished with vacuum power, the levers 14 are connected by the pin 13 with a yoke 18 which is suitably secured to the reduced end of a tube 19 forming a valve casing. This casing in turn is fastened to one end of a tubular piston rod 20 which is slidably mounted in a bushing 21 fastened in the end 22 of a diaphragm chamber 23.

The bushing 21 is rather elongated and its outer end is sealed against air and dirt with a packing 24 around the piston rod held in position by a releasable snap spring 25. The opposite end of the bushing is provided with a flexible packing ring 26 retained in the bushing recess by means of a plate 27 held in place by a removable snap ring 28. The inner end of the piston rod 20 which is disposed within the diaphragm chamber 23 is provided with a stop collar 29 which engages the plate 28 to limit outward movement of the piston rod. Against this stop collar is clamped one half 30 of a reaction chamber housing held on the piston rod by means of the nut 31.

The diaphragm chamber 23 is composed of two similar cup-shaped stampings 32 and 33 provided with complementary annular radial flanges 34 adapted to be secured together in any suitable manner and to clamp therebetween, the margins of a disc shaped flexible diaphragm 35 which constitutes primary and secondary diaphragms 35 and 35' respectively for the power actuator. This diaphragm divides the chamber into two compartments 36 and 37, the latter being adapted to always be subjected to a vacuum condition by means of a nipple 38 connected by conduit 39 to the intake manifold of an internal combustion engine. The section 33 of the vacuum chamber is also provided with a U-shaped bracket 40 having perforated legs whereby the casing may be pivotally connected to any stationary part of the vehicle chassis.

The stepped stamped housing section 30 cooperates with a correspondingly shaped housing section 41, which, together enclose the enlarged central portion of the diaphragm 35 and constitutes the secondary diaphragm 35'. These sections are secured to opposite sides of a secondary diaphragm 35' by suitable means. It will be noted that the diaphragm 35 as a whole, tapers in thickness from its outer relatively thick margin to a relatively thin central portion 35'. The central portion of the diaphragm separates the housing into a pair of chambers 43 and 44 which normally communicate with the chambers 37 and 36 respectively, by means of apertures 45 and 46 in the axially thickened portions of the diaphragm placed in registration with apertures 47 and 48 of the housing sections. The portion of housing section 41 opposite the aperture 46 in the diaphragm is provided with an integral offset portion 49 so that the clamping of this section against the diaphragm will not interfere with the passage of air from chamber 36 to chamber 44, and a corresponding offset portion 50 is provided in the housing section 30 opposite the aperture 45 so as not to interfere with the passage and communication between the chambers 37 and 43 and thence through the tubular piston rod 20 to the valve casing 19.

In order to secure a valve operating rod 51, which extends lengthwise through the tubular piston rod 20, to the center of the diaphragm 35 between the housing sections 30 and 41, the inner end of the valve rod 51 is reduced and a pair of enlarged centrally perforated discs 52 are positioned upon opposite sides to the central portion of the diaphragm and are clamped thereto with washers and a lock nut 53. In order to retain this central portion of the diaphragm urged toward the rear end of the hollow piston rod 20 and incidentally retain the valve, to be presently described, in a brake release position, a spiral coil spring 54 is disposed between the diaphragm and the housing section 41. A similar larger spring 55 is positioned in the chamber 37 to normally stress the diaphragm 35 toward the left of the Figure 1, and toward the forward section 32 of the vacuum chamber.

The pressure of air in forward chamber 36 of the diaphragm chamber is furnished by a flexible conduit 56 having one end secured in fitting 57 attached to the section 32 of the diaphragm chamber and its other end secured in a fitting 58 extending laterally from the valve casing 19 in alignment with a lateral port 59 positioned between the ends of the valve casing. When the brakes are in release position this port 59 normally communicates with the passage through the tubular piston rod 20 and consequently with chambers 43 and 37, which latter, is at all times connected with the intake manifold of the internal combustion engine. A collar 59' is positioned in the valve housing against the forward end of the tubular piston rod and a rubber packing ring 60 is juxtaposed in this collar to form a flexible and leak proof valve seat for engagement with one end of a reciprocable spool valve 61. The springs 54 and 55 in the vacuum chamber force the ball end of the valve rod 51 against a correspondingly shaped socket in the end of the valve 61 to normally urge it against a yieldable packing ring 62 arranged in abutting relation with the end of a sleeve 63 fixed in position within the valve casing 19. This sleeve and valve casing are provided with registering openings 64 which communicate with an air cleaner 65 which filters the atmospheric air entering the valve casing.

The other end of the spool valve 61 is provided with a concave seat which engages with a stem 66 extending through the center of a rubber boot 67 and terminating in a threaded end upon which a nut 68 is threaded for abutment with a yoke 69. The arms of this yoke straddle the lower end of the foot pedal between the two levers 14. The bridge portion of this yoke has an aperture to receive the threaded end of the valve stem 66.

An accordion shaped rubber boot 70 has one end fixed to the bushing 21 and its other end to the valve casing 19 to enclose the tubular piston rod 20 which slides in the bushing 21.

The operation of the unit to apply the brakes 5 is as follows:

When the brakes are in release position, various parts of the power unit are in the position shown in Fig. 1, with a vacuum condition existing in chambers 36 and 37 on opposite sides of the diaphragm 35 due to communication of these chambers through diaphragm port 45, housing chamber 43, through the hollow piston rod 20, valve port 59, flexible tubing 56 and chamber 36. This vacuum condition is maintained due to the connection of the intake manifold of the internal combustion engine with chamber 37 through conduit 39.

To obtain an application of the brakes, the pedal 10 is moved in the direction of the arrows in Fig. 3, which does not affect the levers 14, at this moment, due to the lost motion provided in the enlarged openings 12 and 16. However, the lower end of the foot pedal initially moves the yoke 69 and valve 61 to the right of Fig. 1 causing the end of the valve to seat against the yieldable seat 60 and thereby cut off communication between the tubular piston rod 20 and the port 59. The valve, in moving to its seat 60, withdraws from the seat 62 and gradually opens the port 59 to the atmospheric pressure coming through the filter or cleaner 65 and port 64 so that air at atmospheric pressure passes through the conduit 56 into diaphragm chamber 36 to unbalance the diaphragm 35 and move it to the right of this figure thereby moving the hollow piston rod 20 and levers 14 to the right of Figs. 1 and 3 which moves the rod 17 and master cylinder plunger to the right to force the column of liquid to the individual brake chambers and thereby apply the brakes. At the same time, air under atmospheric pressure travels from chamber 36 through the diaphragm port 46 into the chamber 44 while the vacuum condition is maintained in the chamber 43 on the opposite side of the central part of the diaphragm. In moving to the right of the figure, diaphragm 35 moves the hollow piston rod 20 and valve casing 19 to the right of the figure until the valve 61 covers port 59 to hold pressure until the foot pedal is moved again from its last position. The pressure upon the central portion 35' of the diaphragm will be exercised upon the valve rod 51 so that it will tend to resist further depression of the foot pedal and apprise the operator of the extent to which the brake application is made. Upon release of the foot pedal, the valve 61 is permitted to return to its normal closed position which opens communication between the hollow piston rod 20 and the flexible conduit 56 so as to reestablish vacuum conditions on opposite sides of the diaphragm 35 in both of the chambers 23 and the housing 41 on opposite sides of the central portion of the diaphragm so that all parts are again in balanced and brake release position.

In Fig. 6 a slightly modified form of diaphragm chamber and arrangement is illustrated for accomplishing the same purposes with emphasis upon a more severe reaction rate upon the foot pedal. This is accomplished by providing a diaphragm 23' composed of two end sections 32' and 33' clamped to an intermediate channel-shaped section. A pair of diaphragms 72 and 73 are clamped between opposite sides of the intermediate section 71 and the two end sections of the housing so as to divide the housing into a forward chamber 74 and intermediate one 75 and a rear chamber 76. The forward chamber 74' is provided with a conduit nipple 57' to which the flexible conduit 77 is connected at one end and at its opposite end to the nipple 58 of valve casing 19. To this conduit 77 is connected an auxiliary conduit 78 which is connected with nipple 79 communicating with chamber 76 so that the same pressure conditions always exist in the two end chambers 74 and 76.

Those parts of Fig. 6 which are identical with corresponding parts of Fig. 1 are marked with identical reference characters.

The diaphragm 72 is secured to the end of hollow piston rod 20 by a pair of clamping plates 80, clamping the thickened annular edge of the diaphragm 72 therebetween. These two plates are held in fixed position on the end of the piston rod by a pair of clamping nuts 81.

The other diaphragm 73 has a thickened annular central portion 82 securely clamped between a pair of smaller clamping plates 83 fixed to the end of the valve rod 51 in a corresponding manner. The difference in diameter of plates 80 and 83 constitutes a differential, as the vacuum exercises greater force upon the larger plates 80. A coiled compression spiral spring 84 is disposed between the outer clamping plate 83 and the end of the housing section 33' to normally urge the valve 61 toward a brake release position as shown.

In a normal brake release position, a vacuum condition in chamber 75 is constantly maintained in all positions of the apparatus by the manifold connection 39' with the internal combustion engine. In brake release position, this same vacuum condition maintained in chambers 74 and 76 so as to balance the diaphragms by reason of the fact that chamber 75 communicates with the valve port 59 through the hollow piston rod 20 and thence through the conduit connection 79 to both of the chambers 74 and 76. When the pedal is operated to apply the brakes, the valve 61 closes port 59 thereby cutting off communication of chambers 74 and 75 and at the same time opening the atmosphere to port 59 so that air under atmospheric pressure passes through the flexible conduit 77 and into the two end chambers 74 and 76. With a vacuum condition existing in the intermediate chamber 75 the hollow piston rod 20 is moved to the right of the figure to apply the brakes at the same time air pressure on diaphragm 73 existing in chamber 76 is exerted upon the valve rod 51 to tend to resist further movement of the foot pedal as described in the previous modification.

In Fig. 7 a further modification of the power actuator is illustrated and parts thereof corresponding with parts of the preceding modifications are marked with corresponding reference numerals. The greatest difference in this modification is that the diaphragm chamber is replaced with a power actuator cylinder 85 having a piston 86 reciprocable therein instead of a diaphragm. This piston is provided with a leather cup packing 87 and is formed into a hollow reaction chamber for the provision of the complementary piston plate 88 secured to the hollow piston rod 20. This hollow piston is divided into a pair of pressure chambers 89 and 90 by a diaphragm 91 secured at its outer margins to inwardly offset portions 92 of piston 86 and 93 of piston plate 88. These inwardly offset portions are secured to a common piston ring 94 which at its lowest side has an opening 95 registering with openings in the piston offset 92 and packing ring 87 so that chamber 89 normally communicates with chamber 37 to the right of the piston 86. The upper portion of the ring 94 is also provided with an opening 96 which registers with openings in the offset portion 93 of the piston plate and the packing 87 so as to normally communicate the forward chamber 36 with the rear diaphragm chamber 90. The piston 86 is normally urged toward the left hand end of the cylinder 85 by means of a spring 97 bearing on the end of the cylinder which is suspended from the chassis and which is normally connected to the intake manifold of an internal combustion engine by nipple 38 as in the preceding forms. Consequently, a vacuum condition is maintained at all times in chambers 37 and 89 so that when the valve 61 is cracked to the atmosphere, air at atmospheric pressure exerts itself in chambers 36 and 90 to move the piston 86 to the right for brake application and to exercise resistance to further forward movement of the foot pedal in order to apprise the operator of the extent of brake application.

It is to be understood that various changes in the size, shape and relation of parts may be varied within the scope of the appended claims.

I claim:

1. A self-contained booster unit comprising a diaphragm casing having one end communicating with a source of vacuum, a hollow rod mounted in said casing, a control valve casing mounted on said rod, a conduit from the valve to the other end of said casing, a diaphragm dividing the casing into a pair of chambers and connected to said rod, a valve rod secured to the diaphragm and extending through said hollow rod into the valve casing, and a housing enclosing a part of the diaphragm and secured to said hollow rod, said housing communicating with the chambers at opposite sides of the diaphragm, and the enclosed part of the diaphragm serving to oppose movement of the valve in the direction of its opening movement.

2. A self-contained booster unit comprising a diaphragm casing having one end communicating at all times with a source of vacuum, a hollow rod mounted in said casing and having one end disposed exteriorly of the casing a substantial distance therebeyond, a control valve mounted at the free end of said rod, a conduit from the valve to the other end of said casing, a diaphragm dividing the casing into a pair of chambers and connected to said hollow rod, a valve rod secured to the diaphragm and extending through said hollow rod to said control valve, a housing enclosing the central part of said diaphragm and secured to said hollow rod, the chamber defined at each side of the diaphragm and housing communicating with the chamber defined between the other side of the diaphragm and said casing, and the enclosed part of the diaphragm serving to oppose movement of the valve in the direction of its opening movement.

3. A self-contained booster unit comprising an actuator casing, a hollow rod connected at one end to a mechanism to be operated and its other end being slidably mounted in said casing, a control valve reciprocably mounted in said rod and cooperating with air and vacuum ports in the rod, a diaphragm dividing said casing into a plurality of chambers, a housing structure secured to opposite sides of the central portion of said diaphragm and connected to said hollow rod, the enclosed part of said diaphragm dividing said housing into a pair of chambers and being connected to said valve, and the chamber defined between the diaphragm and housing on each side being in communication with the chamber in the casing on the opposite side of the diaphragm.

4. A vacuum brake appliance comprising a fixed power actuator having a diaphragm therein and a hollow piston rod, a control valve casing carried by the outer end of the rod, a conduit connecting the valve casing with the actuator on one side of the diaphragm, valve casing connections to the atmosphere and to a source of vacuum, a manually controlled valve body in said valve casing, adapted to alternately open the hollow piston rod to air and vacuum, a valve rod connected to the center of the diaphragm and extending through said piston rod to the valve, and a housing enclosing both sides of the central portion of the diaphragm and having an opening on one side thereof through the diaphragm to open between the housing and diaphragm on one side of the latter and having a second opening in the opposite side through the diaphragm to open between the housing and diaphragm on the opposite side of the latter.

H. R. FITZGERALD.